United States Patent [19]

Perez-Mendez et al.

[11] Patent Number: 4,465,933

[45] Date of Patent: Aug. 14, 1984

[54] WIRE CHAMBER RADIATION DETECTOR WITH DISCHARGE CONTROL

[75] Inventors: Victor Perez-Mendez; Terrence A. Mulera, both of Berkeley, Calif.

[73] Assignee: The United States of America as represented by the United States Department of Energy, Washington, D.C.

[21] Appl. No.: 363,201

[22] Filed: Mar. 29, 1982

[51] Int. Cl.³ .............................................. H01J 47/18
[52] U.S. Cl. ..................................... 250/385; 250/374
[58] Field of Search .................. 250/385, 374, 385 SC

[56] References Cited

U.S. PATENT DOCUMENTS 3,461,293  8/1969  Horwitz ............................ 250/358
3,479,516  11/1969  McGee et al. ............... 250/213 VT

OTHER PUBLICATIONS

M. J. Neumann, T. H. Sherrard, "Improvement of Wire Chamber Resolution, Multiple Event Capability, and Other Techniques with Programmed Discharge", *IEEE Trans. Nucl. Sci.*, NS-12 (1965) pp. 379-385.

S. H. Williams, D. W. G. S. Leith, M. Poppe, T. Ypsilantis, "An Evaluation of Detectors for a Cerenkov Ring-Imaging Chamber", *IEEE Transactions on Nuclear Science*, vol. NS-27, No. 1 (Feb. 1980), pp. 91-95.

H. Kobayakawa, T. Yamaki, "The Glow Memory Chamber: A New Type Wire Chamber for Efficient Readout of Multiple-Track Event", 1973 *International Conference on Instrumentation for High Energy Physics*, Frascati, Italy (Aug. 1973), pp. 321-326.

G. Roux, J. C. Gaucher, J. Leloup, J. P. Morucci, A. Lansiart, "New Developments in Gas-Filled Image Intensifier Detectors for X and Gamma Rays", *IEEE Trans. Nucl. Sci.*, NS-15 (1968), pp. 67-75.

T. Mulera, M. Elola, V. Perez-Mendez, P. Wiedenbeck, "A Multiplicity Detector Using a Glow Discharge Memory", No. LBL-12572, Lawrence Berkeley Laboratory, Berkeley, CA (Oct. 23, 1981), pp. 1-2.

H. Joseph Hoehn, Richard A. Martel, "A 60 Line Per Inch Plasma Display Panel", *IEEE Transactions on Electron Devices*, ED-18, No. 9 (Sep. 1971), pp. 659-663.

*Primary Examiner*—Janice A. Howell
*Assistant Examiner*—Constantine Hannaher
*Attorney, Agent, or Firm*—Clifton E. Clouse, Jr.; Roger S. Gaither; Michael F. Esposito

[57] ABSTRACT

A wire chamber radiation detector (11) has spaced apart parallel electrodes (16) and grids (17, 18, 19) defining an ignition region (21) in which charged particles (12) or other ionizing radiations initiate brief localized avalanche discharges (93) and defining an adjacent memory region (22) in which sustained glow discharges (94) are initiated by the primary discharges (93). Conductors (29, 32) of the grids (18, 19) at each side of the memory section (22) extend in orthogonal directions enabling readout of the X-Y coordinates of locations at which charged particles (12) were detected by sequentially transmitting pulses to the conductors (29) of one grid (18) while detecting transmissions of the pulses to the orthogonal conductors (36) of the other grid (19) through glow discharges (94). One of the grids (19) bounding the memory region (22) is defined by an array of conductive elements (32) each of which is connected to the associated readout conductor (36) through a separate resistance (37). The wire chamber (11) avoids ambiguities and imprecisions in the readout of coordinates when large numbers of simultaneous or near simultaneous charged particles (12) have been detected. Down time between detection periods and the generation of radio frequency noise are also reduced.

14 Claims, 6 Drawing Figures

FIG_1

FIG_4

FIG-6

WIRE CHAMBER RADIATION DETECTOR WITH DISCHARGE CONTROL

BACKGROUND OF THE INVENTION

This invention relates to the detection of charged particles or other ionizing radiations. More particularly the invention relates to wire chambers which detect charged particles or the like throughout an extensive area while providing data identifying the specific locations at which the particles or the like are detected. The United States government has rights in this invention pursuant to contract number W-7405-ENG-48 between the United States Department of Energy and the University of California.

Conventional wire chambers such as spark chambers, originally included a pair of parallel grids separated by a low pressure gas region, each such grid being formed of a series of parallel electrical conductors or wires. A voltage differential was applied across the grids so that charged particles which passed between the grids initiated momentary localized spark discharges between one of the conductors of each grid.

In a conventional wire chamber of the above described kind, the conductors of one grid extend orthogonally to the conductors of the other. Consequently it is possible to determine the location or X-Y coordinates of a single spark and thus the location of the charged particle or the like at the time of detection. In a typical coordinate readout system, a separate one of a series of ferrite cores or other settable and resettable circuit elements has been coupled to each conductor of each of the electrodes. The momentary current which passes through a particular conductor of one grid and a particular orthogonal conductor of the other grid, as a result of a spark, sets the two cores which are coupled to those particular conductors. The spark location may then be determined by detecting which specific core at each grid is in set condition.

Wire chambers are a highly advantageous type of radiation detector for certain purposes because of the capability of detecting charged particles throughout a broad area while also providing the coordinates of the points of detection of the particles. In nuclear research operations at a charged particle accelerator, for example, the analysis of interactions between high energy particles or the like and target nuclei can be greatly facilitated by such information. Information on the spatial distribution of secondary particles emitted from such an interaction may be used under certain conditions to aid in identifying such particles and/or for determining properties of the particles such as mass and momentum for example.

The full potential of wire chambers for such purposes and others has not heretofore been realized because of certain characteristics of prior designs. For example, the original basic wire chamber configuration as described above may produce ambiguous coordinate data if more than one particle is detected between readouts.

If one spark has occurred between two particular conductors of the two grids and another spark has occurred between two different conductors of each grid, then two cores of each grid are set. This condition of the cores indicates that there were at least two sparks but it is not possible to determine from the condition of the cores which particular two of four possible locations were the sites of the two sparks. If a larger number of sparks have occurred the ambiguity in the readout greatly increases. The ambiguity is not present if all sparks have occurred along a single conductor of one of the grids but that condition is a less probable one and becomes increasingly less probable in proportion to the number of sparks which have occurred.

It is possible to increase the number of spark locations which can be resolved without ambiguity by providing additional grids formed of conductors which extend at different angles than the conductors of the two primary grids. Such a system becomes prohibitively complex if a sizable number of particle detections are to be located.

In addition to the limitations on use arising from the coordinate ambiguity, wire chambers have in general exhibited long dead times between particle detection periods and high radio frequency noise levels. These undesirable effects are brought about by the highly ionizing electrical spark discharges and become more severe in proportion to the number of simultaneous or near simultaneous discharges that occur.

One result of the several problems discussed above is that wire chambers of the traditional form are ill-suited for the simultaneous detection of a sizable number of particles or for detecting sequences of nearly simultaneous particles.

It has heretofore been proposed to provide a spark location memory within wire chambers together with a different form of readout system in order to alleviate the ambiguity problem in particular. The memory section is defined by an additional grid and one of the primary grids, the additional grid having conductors extending orthogonally to those of the adjacent one of the primary grids. A DC voltage is applied between the additional electrode and the adjacent one of the primary grids. Consequently, each spark between the two primary grids triggers a glow discharge at the corresponding location in the memory section and the glow discharges remain after the sparks extinguish. In theory, the coordinates of a number of sparks may then be read out by sequentially applying electrical pulses to each conductor of one grid of the memory section while detecting transmissions of such pulses to the orthogonal conductors of the other memory section grid through the conductive glow discharges at specific intersections of the two sets of grid conductors.

In the forms heretofore contemplated, wire chambers having a glow discharge memory section do not fully eliminate ambiguities in the coordinate readout and remain subject to the other problems discussed above. If the conductors of the memory section grids are sufficiently numerous and closely spaced to provide a desirable degree of spatial resolution, more than one glow discharge may be ignited at more than one site by a spark discharge. The glow discharges may shift from the original positions or be extinguished by the effects of other spark discharges. Undesirably long dead times are still required and radio frequency noise effects remain severe.

SUMMARY OF THE INVENTION

Accordingly it is an object of this invention to provide for a more accurate determination of the locations at which charged particles or the like are detected within a wire chamber.

It is another object of this invention to avoid ambiguities in the readout of spatial coordinate data for charged particles or the like which are detected in a wire chamber detector.

It is an object of the invention to provide for the detection and locating of large numbers of simultaneous or nearly simultaneous charged particles or the like in a wire chamber detector.

It is another object of this invention to reduce the dead times between detection periods in a radiation detector of the wire chamber form.

It is another object of the invention to reduce the generation of radio frequency noise within a wire chamber radiation detector.

It is still another object of the invention to provide a wire chamber radiation detector having a more accurate and stable internal memory section for storing coordinate information indicative of the different locations at which a number of charged particles or the like have been detected.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a wire chamber for detecting charged particles or other ionizing radiations has first, second and third spaced apart electrodes. The first and second electrodes define an ignition region in which the charged particles initiate localized primary electrical discharges. The second and third electrodes define a memory region in which localized glow discharges are initiated by the primary discharges. Means are also provided for detecting the spatial locations of the glow discharges within the memory section. In accordance with one aspect of the invention, the wire chamber radiation detector further includes discharge limiting means for restricting the primary discharges to the avalanche stage of electrical discharge progression.

Preferably, in another aspect of the invention, the discharge control means includes a fourth electrode situated between the first and second electrodes and means for applying a discharge control voltage pulse to the fourth electrode concurrently with application of the high voltage pulse across the first and second electrodes.

Preferably, in still another aspect of the invention, the second electrode is defined by a plurality of parallel conductors extending in a first direction and the third electrode is defined by an array of spaced apart electrically conductive elements arranged in a plurality of columns which extend in a second direction that is orthogonal to the first direction. The third electrode further includes a plurality of readout signal conductors each being electrically connected to the conductive elements of an associated individual one of the columns.

The invention enables the detection and locating of large numbers of simultaneous or nearly simultaneous charged particles or the like as such particles initiate controlled electrical discharges of the avalanche type rather than intense disruptive spark discharges. Unambiguous coordinate data may be obtained from the sustained glow discharges ignited in the memory section of the wire chamber by the controlled primary discharges. Ignition of erroneously located glow discharges is reduced or avoided, the chamber may be more quickly cleared of space charge in preparation for a subsequent cycle of operation and radio frequency noise is substantially reduced. Further, in a preferred form of the invention, the glow discharges in the memory are stabilized both with respect to location and duration by providing a separate conductive element at each glow discharge site of the grid which defines one side of the glow memory section and by the introduction of a separate electrical resistance into the current path at each glow discharge site of the grid.

BRIEF DESCRIPTION OF THE DRAWINGS

The accompanying drawings which are incorporated in and form a part of the specification, illustrate a preferred embodiment of the invention and, together with the description, serve to explain the principles of the invention. In the drawings.

DETAILED DESCRIPTION OF THE INVENTION

Reference will now be made in detail to the present preferred embodiment of the invention, which is illustrated in the accompanying drawings.

Figure 1:
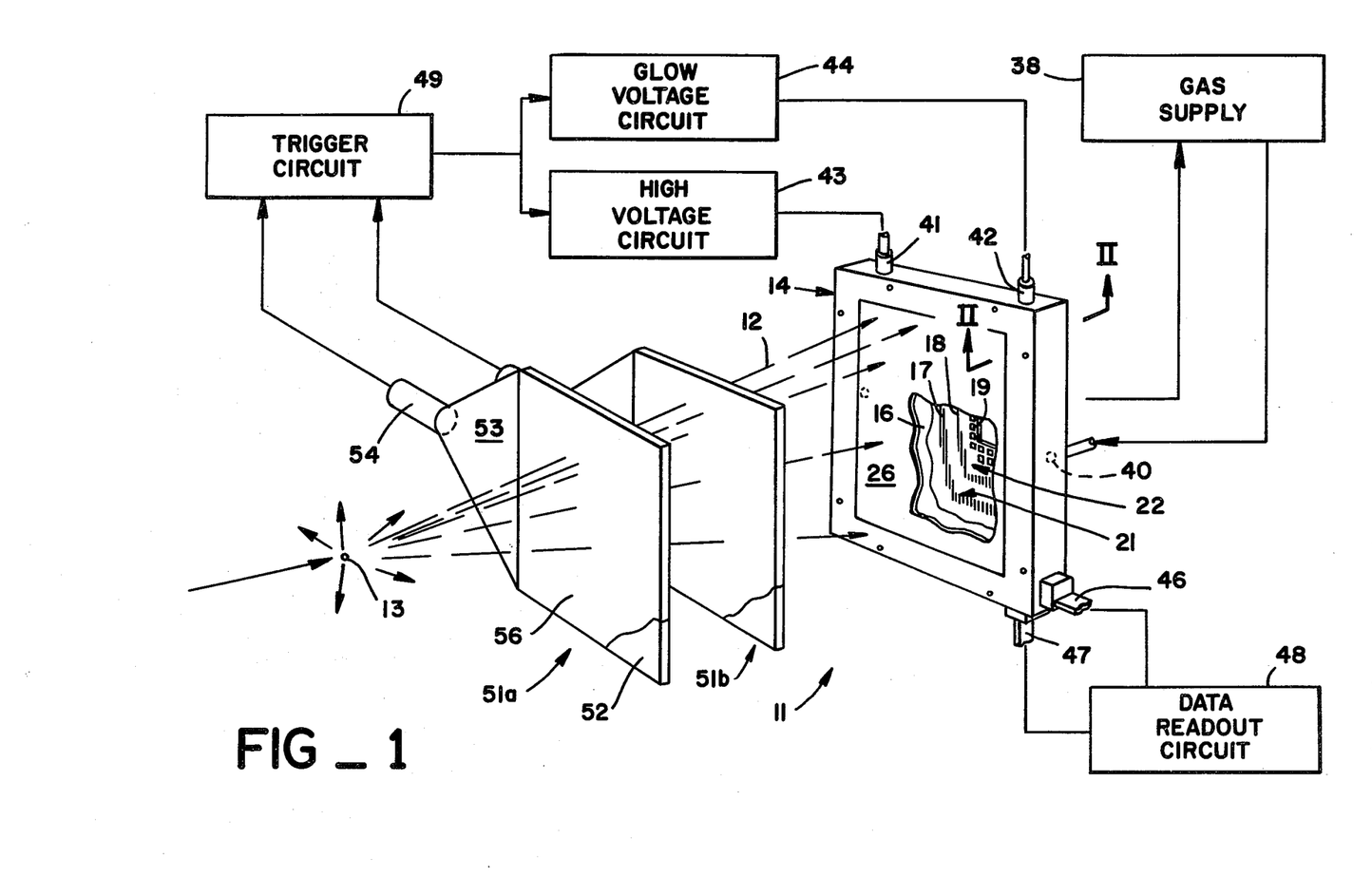
FIG. 1 is a perspective view of a wire chamber in accordance with an embodiment of the invention, certain portions of the structure being shown broken out and electrical and fluid circuit components being shown in schematic form.

Referring initially to FIG. 1, a wire chamber 11 in accordance with one embodiment of the invention is depicted as it may be used to detect and locate the paths 12 of secondary particles emitted in the forward direction from a nuclear interaction 13 at a charged particle accelerator or the like. An essentially similar wire chamber 11 may be used for detecting and locating ionizing radiations originating from other sources and the chamber may have other proportions and configurations appropriate to such other usages.

The wire chamber 11 of this particular example includes a square frame 14 supporting four parallel spaced-apart electrodes or grids including a high voltage electrode 16, a discharge control grid 17, an intermediate grid 18 and a memory grid 19. The region between high voltage electrode 16 and intermediate grid 18 constitutes a primary discharge or ignition section 21 of the wire chamber while the region between intermediate grid 18 and memory grid 19 constitutes a memory section 22.

Figure 2:
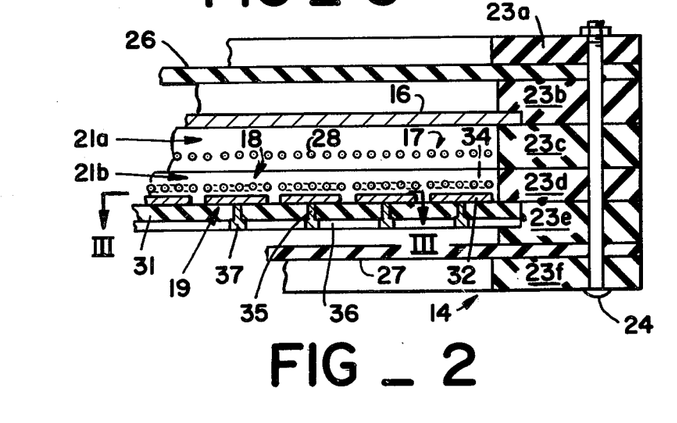
FIG. 2 is a section view of a portion of the wire chamber structure of FIG. 1 taken along line II—II thereof.

Referring now to FIG. 2 in conjunction with FIG. 1, the frame 14 in this example is formed by a series of six juxtaposed rectangular laminations 23a to 23f formed of electrically insulative material and which are secured together by suitable means such as bolts 24. A front wall of the wire chamber 11 is formed by a thin plate 26 having edges retained between the initial two laminations 23a and 23b and is also formed of insulating material. A back wall of the chamber is formed by a similar plate 27 retained between the final two laminations 23e and 23f.

The high voltage electrode 16 of this example is a thin solid rectangular plate 16 formed of electrically conductive material and is retained between laminations 23b and 23c in spaced apart relation from the front wall 26. Discharge control grid 17 is formed by spaced apart parallel conductors or wires 28 having ends secured to frame lamination 23c. The discharge control grid 17 is equidistantly spaced, in this example, from both the high voltage electrode 16 and intermediate grid 18 to divide the ignition section 21 of the wire chamber 11 into two subsections 21a, 21b. The intermediate grid 18 is defined by another series of spaced apart parallel conductor wires 29 having ends secured to the next lamination 23d. It is usually preferable that the conductors 28 of control grid 17 and conductors 29 of intermediate grid 18 be equal in number and extend in the same direction although this is not an essential requirement in all cases.

Figure 3:
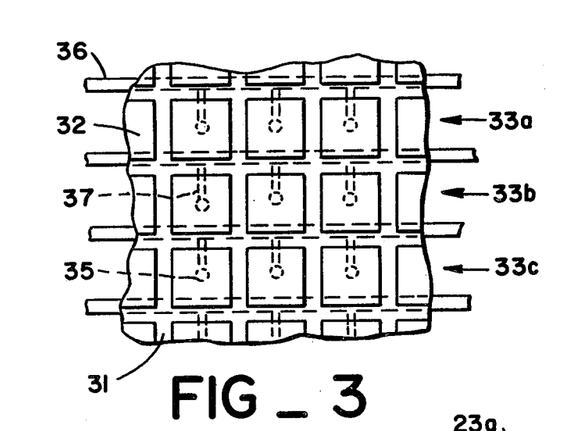
FIG. 3 is a view of a portion of one of the internal grids of the wire chamber taken along line III—III in FIG. 2.

Referring to FIGS. 2 and 3, the memory grid 19 includes a thin insulative circuit board 31 having edges retained between frame laminations 23d and 23e. An array of square, flat, spaced apart conductive elements 32 is secured to the surface of board 31 which faces intermediate grid 18, the conductive elements 32 being arranged in columns, such as columns 33a, 33b and 33c, which extend orthogonally to the conductors 29 of the intermediate grid. Conductive elements 32 are spaced a small distance from the conductors 29 of the intermediate grid 18 and each such conductive element 32 of each column 33 is proportioned to span a separate group of five of the conductors 29 of the intermediate grid. Each such group of five conductors 29 of the intermediate grid are electrically interconnected by end conductors 34 at the supporting frame lamination 23d. Thus the groups of five conductors 29 of the intermediate grid 18 and the columns 33 of conductive elements 32 of the memory grid 31 extend orthogonally at opposite sides of the memory section 22 of the wire chamber to enable readout of the coordinates of detected particles as will hereinafter be described in more detail.

One of a series of readout conductors 36 extends along the opposite surface of circuit board 31 in parallel relationship with an associated one of the columns 33 of conductive elements 32. Each conductive element 32 of each column 33 is connected to the associated one of the readout conductors 36 through a separate one of a series of conductors 35 that extend through board 31 and a separate one of a series of electrical resistors 37 which extend from conductors 35 to the associated readout conductor 36. Although other constructions may also be used the memory grid 19 including board 31, conductive elements 32, conductors 35, readout conductors 36 and resistors 37, can advantageously be fabricated as an integral unit using printed circuit techniques or the like.

The proportions and spacings of components of the several electrodes or grids may be varied dependent on such factors as the voltages which are applied, the composition and pressure of the gas in the region of the grids and the degree of spatial resolution of detected events which is to be obtained. In one example, which should not be considered limitative, the active areas of the electrode 16 and grids 17, 18 and 19 measure 25.4 cm by 25.4 cm. Discharge control grid 17 is spaced one centimeter from the high voltage electrode 16 and the intermediate grid 18 is spaced a similar distance from the discharge control grid, the pulsed negative voltage applied to the high voltage electrode 16 typically being about 6 kilovolts and the pulsed negative voltage which is concurrently applied to the discharge control grid 17 being about 3 kilovolts. A gas mixture consisting of about 89.75% neon, 10% helium and approximately 0.25% acetone is circulated through the grid region at atmospheric pressure. In this particular example, the discharge control grid conductors 28 and intermediate grid conductors 29 are equal in number, extend in the same direction and are 125 micrometer stainless steel wires situated at intervals of 1 millimeter across the grid. The conductive elements 32 of memory grid 19 are spaced 0.8 millimeters from the conductors 29 of intermediate grid 18 and are square measuring about 4 millimeters along the sides. Each resistor 37 has a value of 0.1 megohm. The voltage applied to memory grid 19 in this particular example is a positive 400 volts.

Referring again to FIG. 1, further components of the apparatus include a gas supply 38 coupled to ports 40 at opposite sides of the frame 14 for circulating the gas mixture through the ignition section 21 and memory section 22 of the wire chamber 11. Cable conductors 41 and 42 provide for connection of a pulsed high voltage circuit 43 and glow voltage circuit 44 respectively to the internal elements of the wire chamber as will hereinafter be described in more detail. Additional multi-conductor cables 46 and 47 couple a data readout circuit 48 to the memory section 22 of the wire chamber 11 as will also be hereinafter described in more detail.

Although other means may be used for the purpose, the high voltage circuit 43 and glow voltage circuit 44 of this example are pulsed on in response to occurrence of a nuclear interaction 13 by a trigger circuit 49 controlled by a pair of scintillation detectors 51a and 51b which detect secondary charged particles 12 from the interaction 13 that are directed towards the wire chamber 11. The scintillation detectors 51a and 51b may each be of a known construction having a thin flat scintillator element 52 formed of a material in which charged particles produce scintilla of light and having a tapered light pipe 53 along one edge which transmits such light to a photomultiplier tube 54 that generates an electrical output pulse in response to light. The surfaces of the scintillator elements 52, other than the edges adjacent light pipes 53 are covered with a light opaque coating 56. Two spaced apart scintillator detectors 51a and 51b are employed so that the system is triggered by charge particles traveling from the vicinity of the interaction 13 towards the ignition section 21 of the wire chamber but is not activated by charged particles or other ionizing radiations coming from most other directions.

Certain of the electrical circuits described above are depicted in greater detail in FIG. 4. To facilitate an understanding of the system, the high voltage electrode 16, discharge control grid 17, intermediate grid 18 and memory grid 19 are depicted diagrammatically in FIG. 4 with the electrodes or grids being shown more widely spaced apart and with fewer component conductors than in the previous figures.

Figure 4:
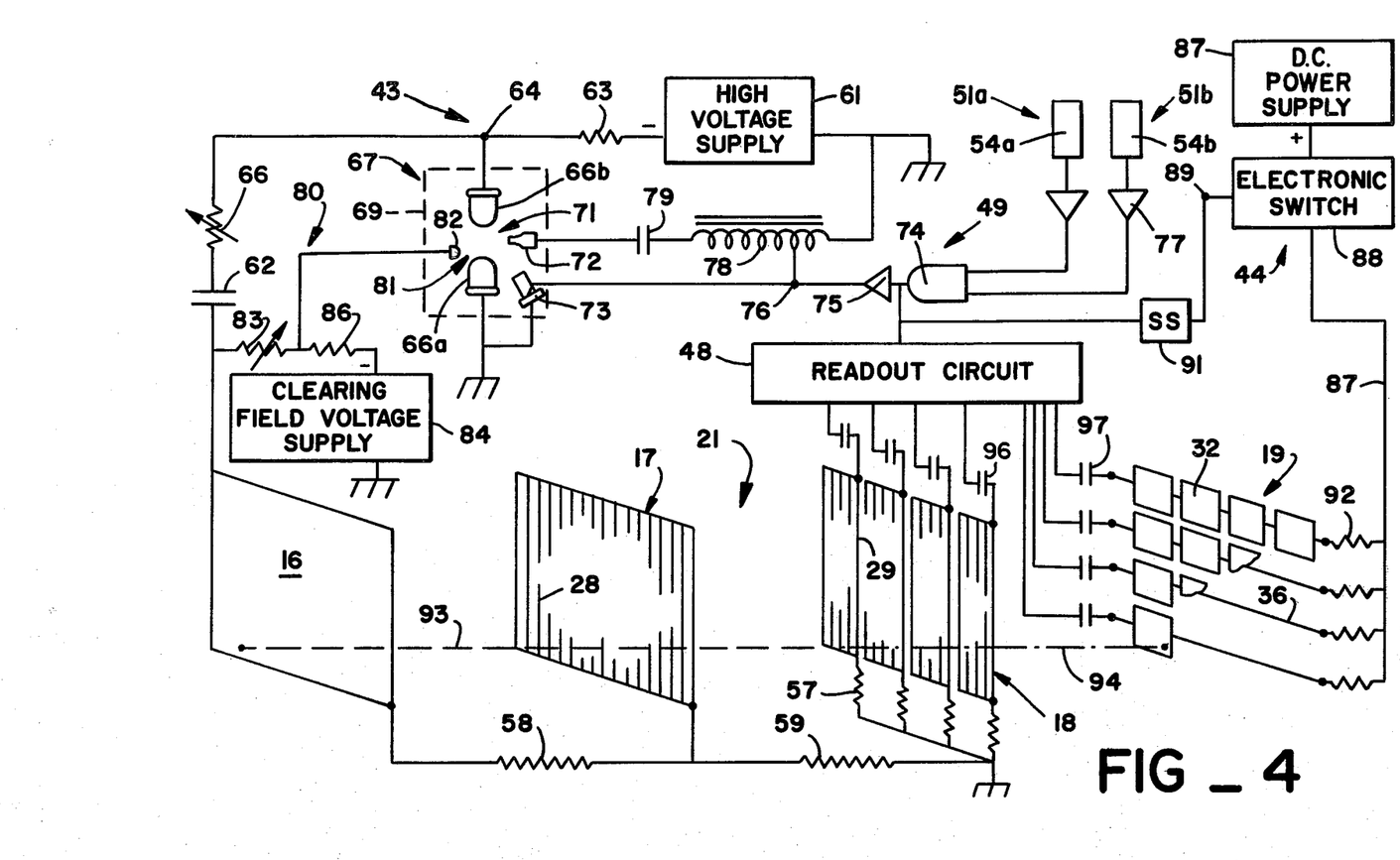
FIG. 4 is a diagrammatic view of the electrode and grid structure of the wire chamber of the preceding figures together with a diagrammatic depiction of associated electrical circuits.

Each of the previously described groups of five of the conductors 29 of intermediate grid 18 is connected to circuit ground through a separate one of a series of electrical resistors 57. The resistors 57 in the ground connection enable readout of coordinate data by applying sequential electrical pulses to individual groups of five conductors 29 as will hereinafter be described in more detail. In this particular example of the invention resistors 57 have values of 0.1 megohm although resistors of other values may also be employed.

High voltage electrode 16 is connected to discharge control grid 17 through a relatively large resistance 58, of one megohm in this particular example, and the discharge control grid is in turn coupled to ground through another resistor 59 of similar value. High voltage circuit 43 applies a negative voltage pulse to the high voltage electrode 16 in response to detection of a nuclear interaction by scintillation detectors 51a and 51b and, owing to resistors 58 and 59, thereby also concurrently applies a pulsed voltage of lesser magnitude, one half in this example, to the discharge control grid 17.

The high voltage circuit 43 of this example includes a negative, high impedance, high voltage supply 61 connected to one side of an energy storage capacitor 62 through a charging resistor 63, a circuit junction 64 and an additional resistor 66, the opposite side of the capacitor being connected to the high voltage electrode 16. Thus, capacitor 62 is charged to a high negative voltage in preparation for each operating cycle. A spark gap switch 67 is connected between circuit junction 64 and ground. Operation of the wire chamber 11 is initiated by closing switch 67 to discharge capacitor 62 and thereby transmit a brief high voltage pulse to high voltage electrode 16.

The spark gap switch 67 may be of the form which includes a pair of primary electrodes 66a and 66b situated within a low pressure gas envelope 69 and spaced apart by a gap 71. A trigger electrode 72 is situated at one side of the gap 71. Primary electrode 66a is grounded and the other primary electrode 66b is coupled to circuit junction 64 and thus acquires a high voltage similar to that on capacitor 62. Application of a trigger voltage pulse to trigger electrode 72 momentarily intensifies the electric field across the gap 71 to the point where a spark discharge occurs between electrodes 66a and 66b, discharging the capacitor 62 to produce a high voltage pulse at high voltage electrode 16. A corona lamp 73 is also pulsed on as the discharge is triggered to direct ultraviolet light into gap 71. This releases photoelectrons which assure a precisely timed initiation of the spark discharge.

The trigger circuit 49 for closing spark gap switch 67 includes a coincidence circuit or two input AND gate 74 having an output 76 which transmits a voltage pulse in response to simultaneous receipt of pulses at each input. Each of the photomultiplier tubes 54a and 54b of the scintillation detectors 51a and 51b is coupled to a separate input of AND gate 74 through a separate one of a pair of amplifiers 77. Thus AND gate 74 generates a trigger signal upon detection of charged particles or the like by scintillation detectors 51a and 51b.

A voltage step-up autotransformer winding 78 has one end grounded and the other end coupled to spark gap trigger electrode 72 through a capacitor 79. AND gate output 76 connects to ground through an amplifier 75 and the primary portion of winding 78. Thus detection of one or more charged particles by scintillators 51a and 51b causes autotransformer 78 to deliver a momentary trigger pulse to trigger electrode 72 of the spark gap switch 67 through capacitor 79. Amplifier 75 simultaneously energizes corona lamp 73.

Following triggering, the discharge current through the spark gap switch 67 rises nearly exponentially with time until it is ultimately limited by the circuit impedance. Means 80 are provided to limit the duration of the resulting high voltage pulse on electrode 16. In particular a secondary spark gap 81 is provided within switch 67 by disposition of an additional electrode 82 at one side of electrode 66a. A discharge resistor 83 is connected between the additional electrode 82 and high voltage electrode 16. The primary spark discharge in the gap 71 triggers a secondary discharge between electrodes 66a and 82 to establish a conductive path for discharging high voltage electrode 16 through resistor 83. The rate of discharge is dependent on the time constant established by the value of resistor 83 and the capacitance of capacitor 62 together with the capacitance of the high voltage electrode 16 itself. Thus the rate of decay of the pulsed voltage at high voltage electrode 16 may be controlled by selection of resistor 83 which may be a variable resistor if desired.

Discharges between the high voltage electrode 16, discharge control grid 17 and intermediate grid 18 during an operating cycle as a result of the detection of charged particles produce substantial ionization of the gas in the electrodes and grid region. The resulting free electrons and ions are eliminated, before the chamber is again pulsed on, to prevent initiation of discharges by such free charges. To minimize the down time between operating cycles needed for this purpose, a clearing field D.C. voltage supply 84 is connected to high voltage electrode 16 through an additional resistor 86 and the previously described resistor 83. This maintains a relatively low negative voltage at electrode 16, during the intervals between high voltage pulses, that acts to drive free electrons towards grids 17 and 18 to speed de-ionization of the gas in the electrode and grid region, the clearing field being 700 volts in this specific example. Gap 71 of spark gap switch 67 is also allowed to deionize prior to substantial recharging of the energy storage capacitor 62. The rate of recharging of capacitor 62 may be controlled for this purpose by selection or adjustment of resistor 63 to provide an appropriately high RC time constant in the charging circuit, the time constant being 8 milliseconds in this particular example.

Glow voltage circuit 44 includes a DC power supply, producing a positive 400 volts in this particular case, connected to a glow voltage supply conductor 87 through an electronic switch 88 which is of the MOSFET type in this example. The glow voltage supply conductor 87 connects to each of the readout conductors 36 of memory section grid 19 through a separate one of a series of resistors 92 which in this example have values of 0.1 megohm. Switch 88 is temporarily closed, to apply glow discharge maintenance voltage to the memory section grid 19, by a single shot or monostable multivibrator 91 connected between the switch control terminal 89 and AND gate 74.

Charged particles entering the ignition section 21 of the wire chamber 11 during pulsing of the high voltage electrode 16 cause ionization in the gas within the chamber. The ionization in turn initiates primary electrical discharges 93 between the high voltage electrode 16 and the essentially grounded intermediate grid 18, the primary discharges being localized to the vicinity of the path of the charged particle within the chamber. As will be further discussed hereinafter, the primary discharges 93 are limited to the avalanche stage of an electrical discharge throughout their duration rather than being allowed to grow into sparks. The primary or avalanche discharges 93 are extinguished as the high voltage pulse decays in the manner previously described, but cause sufficient gas ionization in the region of intermediate grid 18 to initiate localized glow discharges 94 between adjacent points on a conductor 29 of the intermediate grid 18 and the closest one of the conductive elements 32 of the memory grid 19. The glow discharges 94 remain after the intitiating primary discharge 93 extinguishes until such time as the output voltage from single shot 91 terminates and renders switch 88 nonconductive. Single shot 91 is selected to provide a glow discharge maintenance period, about 400 microseconds in this example, sufficiently long to enable readout of the spatial coordinates of the glow discharges 94 as will hereinafter be described.

Referring again to FIG. 1, it is possible in some usages to visually identify and photograph, if desired, the locations of the glow discharges following a cycle of operation if the front wall 26 of the wire chamber is formed of transparent material and the high voltage electrode 16 is formed of parallel wires similar to those of the control grid 17 and intermediate grid 18. More typically, it is preferable to provide a data readout circuit 48 to generate coordinate signals that may variously be printed out, visually displayed and/or processed in a computer or the like.

Referring again to FIG. 4, a readout circuit 48 may be coupled to the intermediate grid 18 through a series of capacitors 96 each of which couples the readout circuit to a separate one of the groups of five interconnected conductors 29 of the intermediate grid. Similarly each of the readout conductors 36 of the memory grid 19 is coupled to readout circuit 38 through a separate one of an additional series of capacitors 97.

Figure 5:
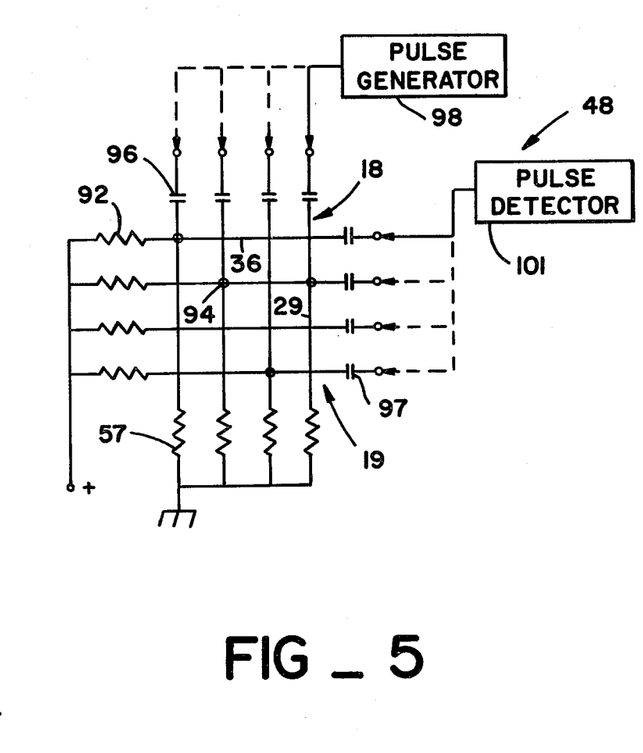
FIG. 5 is a diagram of a portion of the grid structure of a wire chamber in accordance with the preceding figures illustrating how spatial coordinate data for charged particles which have been detected by the apparatus may be obtained.

The basic operation of a readout circuit 48 suitable for this purpose may best be understood by reference to the diagrammatic illustration of FIG. 5. In FIG. 5 each connected group of five conductors 29 of the intermediate grid 18, which define what will herein be designated the X-coordinate, is represented by a single vertical line for simplicity of illustration. The readout conductors 36 of the memory grid 19 are shown extending horizontally in FIG. 5 and define what will herein be designated the Y-coordinate of a particle detection site. Following an operating cycle, the glow discharges 94 constitute conductive paths between the two grids 18 and 19 at locations where particles have been detected. The locations of the glow discharges 94 may be determined by transmitting electrical pulses from a pulse generator 98 to a first of the conductors 29 while utilizing a pulse detector 101 to determine if such pulses can be detected through any of the orthogonal conductors 36 of the other grid. Receipt of a pulse at any of conductors 36 indicates the presence of a glow discharge 94 at the intersection of that conductor and the particular conductor 29 to which the pulses are being applied. This indicates that a charged particle was detected at the corresponding location in the wire chamber. In a simple form of readout circuit 48, this process may then be repeated while transmitting pulses to each of the conductors 29 in turn to determine the X-Y coordinates of all glow discharges 94.

The resistors 57 through which the conductors 29 of the intermediate grid 18 are interconnected inhibit transmission of such pulses from one such conductor to the others of the same grid. Resistors 92 serve a similar purpose at the memory grid 19.

Figure 6:
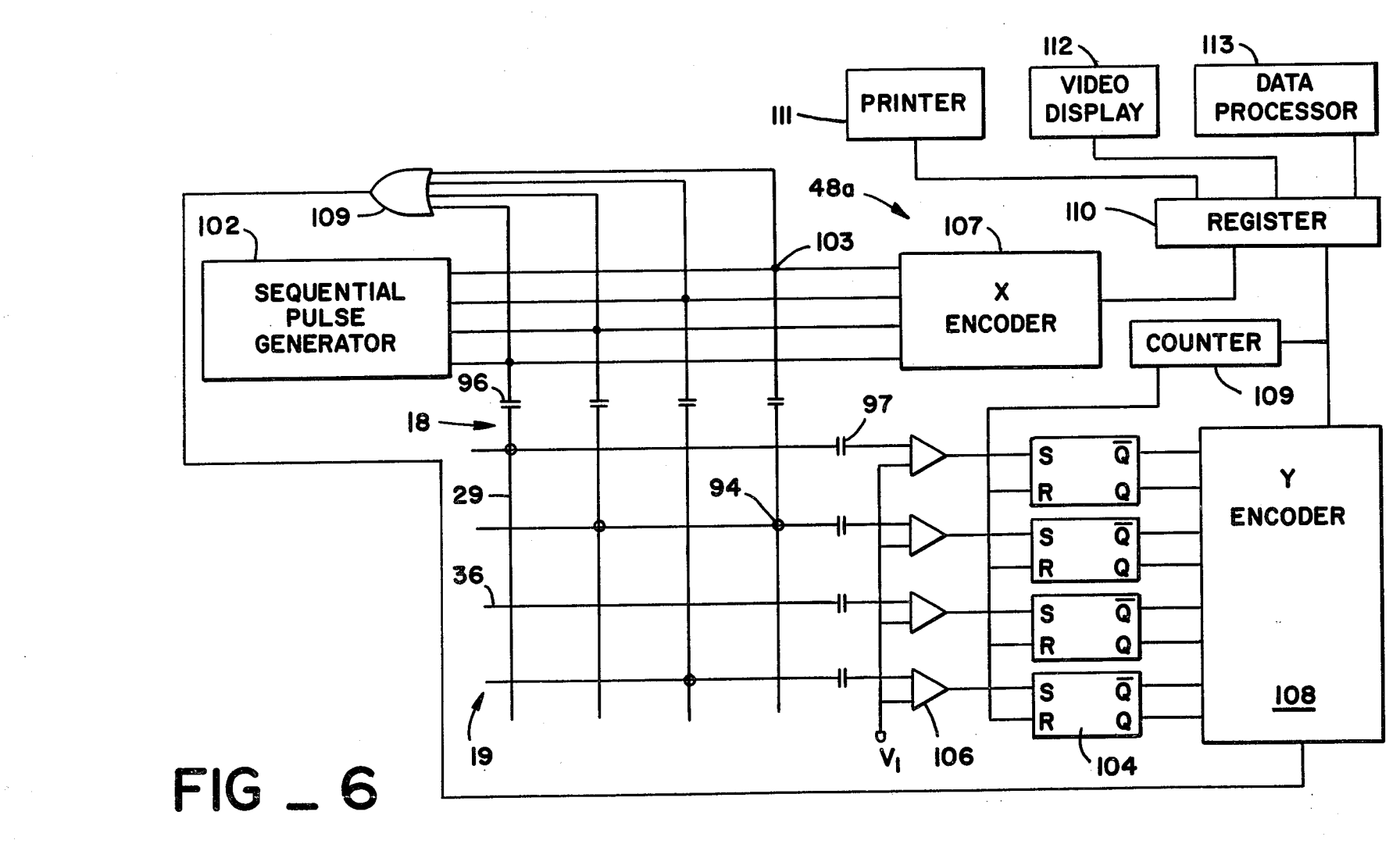
FIG. 6 is a circuit diagram of a data readout circuit for the apparatus of the preceding figures.

In many cases it is desirable to automate the readout process and to produce digital coordinate signals suitable for computer processing. FIG. 6 illustrates a more complex readout circuit 48a for this purpose. The circuit of FIG. 6 includes a pulse generator 102 having a series of output terminals 103 each of which is coupled to a separate one of the conductors 29 of intermediate grid 18 through a separate one of the capacitors 96. Pulse generator 102 is of the type which transmits an output pulse to each output terminal 103 in sequence.

Each of the conductors 36 of memory grid 19 is coupled to the set signal input of a separate one of a series of flip-flops 104 through the associated capacitor 97 and through a separate one of a series of comparators 106 which also receive a reference voltage $V_1$ in order to reject relatively weak pulses that may be transmitted between the grids by processes other than conduction through a glow discharge 94.

When pulse generator 102 transmits a first pulse to a first of the intermediate grid conductors 29 each particular one of the flip-flops 104 is set only if there is a glow discharge 94 between that particular conductor 29 and the particular conductor 36 which is coupled to the flip-flop. The output terminals 103 of pulse transmitter 102 are coupled to an X-coordinate encoder 107 which generates a digital signal identifying the particular output terminal 103 from which each pulse is received. Thus the signals from encoder 107 provide an X-coordinate for glow discharges which are detected at flip-flops 104.

To provide Y-coordinate signals, another encoder 108 is coupled to the set signal output (Q) and the not-set signal output ($\overline{Q}$) of each of the flip-flops 104. An OR gate 109 has inputs coupled to each of the pulse generator outputs 103 to deliver an actuating signal to encoder 108 upon each occurrence of a pulse at any of the pulse generator outputs 103. Upon occurrence of a pulse at the first output 103 of transmitter 102, Y-encoder 108 reads the conditions of each of the flip-flops 104 in sequence and produces digital signals that identify the condition of each flip-flop. Thus the signals from encoder 108 provide Y-coordinates for association with the X-coordinate location signals produced by X-encoder 107 and indicate if a glow discharge 94 is present at each X-Y coordinate location.

A counter 109 counts the output signals from Y-encoder 108 at each readout of flip-flops 104 and resets the flip-flops after the condition of all flip-flops has been transmitted by the encoder. The subsequent output pulse from generator 102 at the next terminal 103 initiates a similar cycle of operation during which encoders 107 and 108 generate signals identifying the locations of any glow discharges along the next of the conductors 29. This process is repeated by the further output pulses from generator 102 until the coordinates of all glow discharges 94 have been read out and encoded.

The coordinate signals from encoders 107 and 108 may be accumulated and stored in a suitable register 110. The stored coordinate data may be transmitted to a printout device 111 or to visual display terminal 112 or to a data processor 113 for analysis.

In operation, with reference to FIG. 1, wire chamber 11 is positioned in the path of the charged particles 12 or other ionizing radiations which are to be detected and scintillation detectors 51a and 51b are located in front of the chamber in positions where the particles to be counted will pass through the sensitive elements 52 of both such detectors. The gas supply 38 is actuated to circulate gas through the electrode and grid region while the chamber is in operation.

Referring now to FIG. 4, capacitor 62 charges to the high voltage provided by supply 61 through resistors 63 and 66 and this voltage also appears across the primary electrodes 66a and 66b of spark gap switch 67. A relatively low negative voltage is applied to the high voltage electrode 16 at this time by clearing field voltage supply 84 through resistors 86 and 83.

Upon detection of one or more charged particles by scintillation detectors 51a and 51b, phototubes 54a and 54b produce virtually simultaneous output pulses which enable AND gate 74 and thereby cause amplifier 75 to transmit a current pulse through the primary portion of autotransformer winding 78. The autotransformer 78 produces a stepped up voltage pulse which is transmitted to trigger electrode 73 through capacitor 79. The resultant over voltaging at gap 71 initiates a spark between the two electrodes 66a and 66b providing a conductive path to ground through which capacitor 62 rapidly discharges. The discharge rate is controllable by an adjustment or appropriate selection of the resistance of resistor 66. Discharge of capacitor 62 applies a high voltage pulse to electrode 16, the rise time of the high voltage pulse being determined by the time constant of the capacitor 62 discharge path as hereinbefore described. The discharge within spark gap switch 67 also establishes a conductive path to ground from electrode 16, through resistor 83, and switch electrodes 82 and 66a. The rate of discharge of the high voltage from electrode 16 through this path and thus the duration of the high voltage pulse is determined by the resistance value of resistor 83 as also previously described.

The avalanche discharges 93 between electrodes 16 and 18 along the paths of charged particles provide conducting paths to ground from the high voltage electrode 16. This acts to reduce the voltage on electrode 16 and thereby makes the discharges 93 effectively self extinguishing. Termination of the high voltage pulse from this cause is normally faster than the above described discharging of the high voltage through resistor 83 and spark gap switch 67. Thus the discharge path through the spark gap switch 67 serves primarily to limit duration of the high voltage pulse in instances where such discharges 93 may not occur as a result of particle detections.

The trigger signal from AND gate 74 also closes electronic switch 88 to apply a steady DC glow maintenance voltage to memory grid 19. The glow discharges 94 ignited by primary discharges 93 remain in the memory section 22 of the wire chamber after the primary discharges have extinguished and thus record the spatial locations at which charged particles were detected. Readout circuit 48 may then be utilized to determine the X-Y coordinates of such locations in the manner hereinbefore described.

The primary discharges 93 in the present invention are not allowed to progress into spark discharges. Under other circumstances, an electrical discharge between spaced apart conductors having a high potential difference begins as a glow discharge then progresses into the avalanche region and then becomes a spark which is a much more abrupt and intense form of discharge. In the present invention, progression of the primary discharges 93 from the avalanche stage to the spark stage is avoided by a combination of factors. These include the presence of the control grid 17, control of the rise time, magnitude and duration of the high voltage pulse at electrode 16 and the characteristics of the gas in the region of the electrodes and grids, each of which factors has been previously discussed.

Relative to sparks, the avalanche discharges 93 produce less intense ionization and such free electrical charges as are produced are highly localized. This assures that ignition of glow discharges 94 in the memory section is localized to the specific sites at which charged particles have been detected. Substantially less radio frequency noise is produced and less time is required for clearing free electrical charge, most notably electrons, from the grid region in preparation for a subsequent cycle of operation.

In this particular example of the invention, time constants are set to provide a high voltage pulse having a rise time of 100 nanoseconds and a duration of 2.0 microseconds. Glow maintenance voltage has a substantially slower rise time of 500 nanoseconds.

In general, growth of the primary discharges 93 into sparks is inhibited by the control of electrical potential and field configuration at the mid region of the discharges with control grid 17, by providing a gas having strong quenching characteristics and by limiting the magnitude, rate of rise and duration of the high voltage pulse. Specific structures, gas compositions and pulse shapes for realizing this object in one example of the invention have been hereinbefore given but it should be understood that such parameters are subject to some variation in different specific embodiments. It should also be recognized that a wire chamber embodying the invention may not necessarily have the essentially flat rectangular configuration of the example herein described. The several grids and electrodes of the chamber may, as but one example, be formed as coaxial cylinders of differing radius in order to detect and locate particles emitted in substantially all radial directions from a nuclear interaction occurring at the center of the structure.

The foregoing description of a preferred embodiment of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In a wire chamber for detecting charged particles or other ionizing radiations, having first, second and third spaced apart electrodes, said first and second electrodes defining an ignition region wherein said charged particles initiate localized primary electrical discharges, said second and third electrodes defining a memory region wherein localized glow discharges are initiated by said primary discharges, and having means for detecting the spatial locations of said glow discharges within said memory region, and high voltage supply means for applying a high voltage pulse across said first and second electrodes, the improvement comprising:

discharge limiting means for restricting said primary discharges to the avalanche stage of electrical discharge progression,     said discharge limiting means including a fourth electrode situated between said first and second electrodes in spaced apart relationship to each thereof, and     means for applying a discharge control voltage pulse to said fourth electrode concurrently with application of said high voltage pulse across said first and second electrodes.

2. A wire chamber as set forth in claim 1 further including means for limiting duration of said high voltage pulse to a period less than that required for growth of said primary discharges into spark discharges.

3. A wire chamber as set forth in claim 1 further including means for slowing the rise time of said high voltage pulse sufficiently to inhibit growth of said primary electrical discharges into spark discharges.

4. A wire chamber as set forth in claim 1 further including means for circulating a spark inhibiting gas within at least said ignition region of said wire chamber.

5. A wire chamber as set forth in claim 1 further including:

a first electrical resistance connected between said first electrode and said fourth electrode, and     a second electrical resistance connected between said fourth electrode and said second electrode.

6. A wire chamber as set forth in claim 1 wherein said first electrode constitutes a high voltage electrode and further including     a high voltage supply,     at least one energy storage capacitor having one side connected to said first electrode and an opposite side connected to said high voltage supply for charging therefrom,     switch means for discharging said capacitor to cause said capacitor to transmit a high voltage pulse to said high voltage electrode,     means for forming a discharge path for the high voltage applied to said high voltage electrode,     means for establishing a first predetermined time constant in the discharge path from said capacitor through said switch means to control the rise time of said high voltage pulse, and     means for establishing a second predetermined time constant in said discharge path from the high voltage electrode to limit the duration of said high voltage pulse.

7. A wire chamber as set forth in claim 1 wherein said second electrode is defined by a plurality of spaced apart electrical conductors extending in a first direction and wherein said third electrode is defined by an array of spaced apart electrically conductive elements arranged in a plurality of columns which extend in a second direction that is orthogonal to said first direction and further including a plurality of readout conductors each being electrically connected to said conductive elements of an associated individual one of said columns thereof.

8. A wire chamber as set forth in claim 7 further including a plurality of electrical resistances, each of said electrical resistances being connected between an individual one of said conductive elements and the associated one of said readout conductors to form said electrical connection therebetween.

9. A wire chamber as set forth in claim 8 wherein said conductive elements and said electrical resistances and said readout conductors are integral elements of a circuit board.

10. In a wire chamber for detecting and locating charged particles or the like, the combination comprising:

a high voltage electrode, a memory electrode spaced therefrom and an intermediate electrode situated between said high voltage electrode and memory electrode and spaced apart from each thereof, at least said intermediate electrode being a grid formed by a plurality of parallel conductors spaced apart to provide passages therebetween,     means for applying high voltage pulses to said high voltage electrode to initiate localized primary electrical discharges between said high voltage electrode and said intermediate electrode in response to passages of said charged particles or the like therebetween,     means for applying a relatively small voltage of longer duration to said memory electrode to initiate and maintain localized glow discharges therebetween at locations corresponding to the locations of said primary discharges,     means for reading out the spatial coordinates of said glow discharges,     a discharge control grid disposed between said high voltage electrode and said intermediate electrode in spaced relationship from each thereof, and     means for applying a control voltage pulse to said discharge control grid concurrently with application of said high voltage pulse to said high voltage electrode, said control voltage pulse being of lesser magnitude than said high voltage pulse.

11. A wire chamber as defined in claim 10 wherein said means for applying a pulsed control voltage to said discharge control grid includes a first resistance connected between said high voltage grid and said discharge control grid and a second resistance connected between said discharge control grid and said intermediate electrode.

12. A wire chamber as set forth in claim 11 wherein said discharge control grid is substantially equidistantly spaced from both said high voltage electrode and said intermediate electrode and wherein said first and second electrical resistances are of substantially equal values.

13. In a wire chamber for detecting and locating charged particles or the like, the combination comprising:

a high voltage electrode, an intermediate electrode spaced apart therefrom and a memory electrode spaced apart from said intermediate electrode, said intermediate electrode including a plurality of parallel spaced apart electrical conductors extending in a first direction and said memory electrode including a plurality of spaced apart conductive elements arranged in parallel spaced apart columns that extend in a second direction which is orthogonal to said first direction and further including a plurality of spaced apart parallel readout conductors each corresponding to a separate one of said columns of conductive elements and still further including a plurality of electrical resistances, each of said readout conductors being connected to said conductive elements of said corresponding column thereof through separate ones of said electrical resistances.

14. A wire chamber as defined in claim 13 wherein said memory grid is formed on a circuit board of non-conductive material and wherein said conductive elements are spaced apart square areas of conductive material on the surface of said board which faces said intermediate electrode, said readout conductors are spaced apart strips of conductive material extending along the opposite surface of said board and said electrical resistances are defined by at least portions of conductive paths which extend through said board between said conductive elements and said readout conductors.

* * * * *